Aug. 7, 1973  R. H. GILBERT  3,751,330
RAILROAD BRAKE SHOES
Filed March 15, 1971
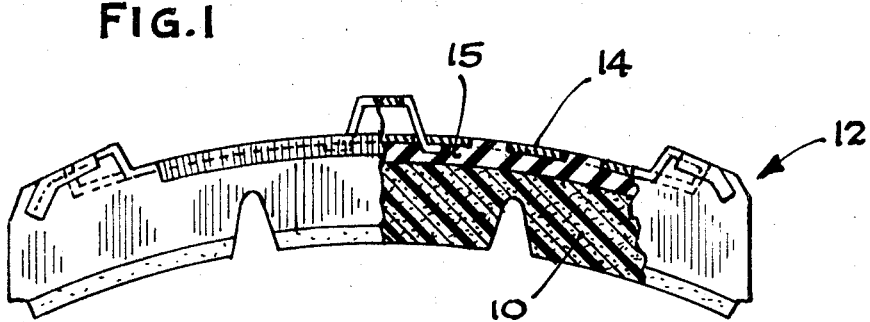
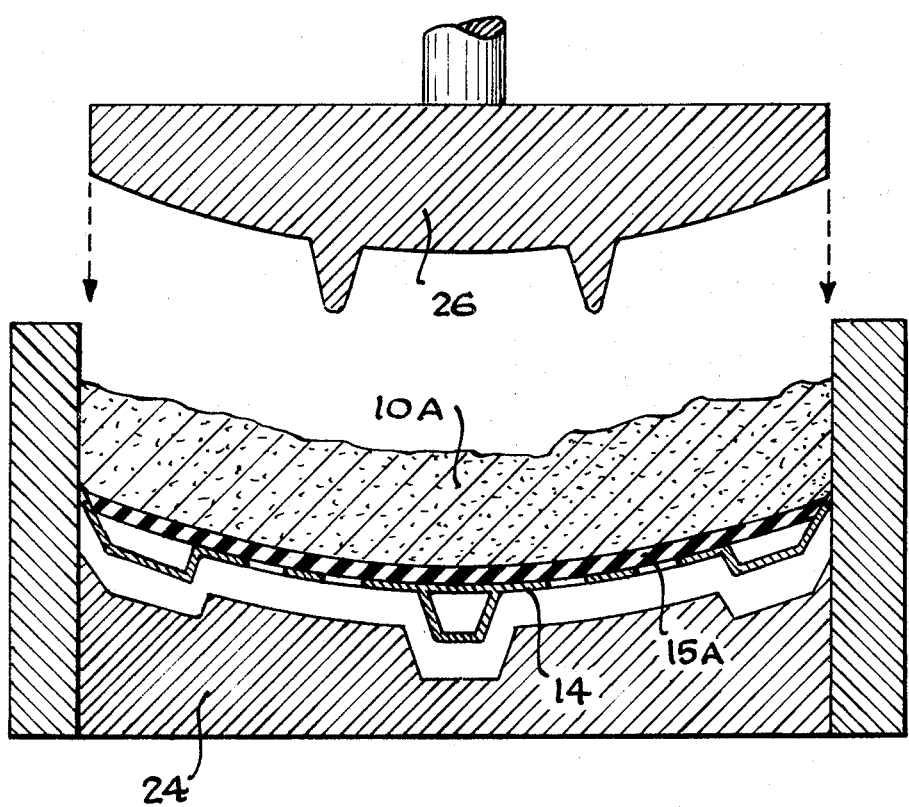
Inventor
Richard H. Gilbert
By Kinzer, Dorn and Zickert
Attorneys

United States Patent Office

3,751,330
Patented Aug. 7, 1973

3,751,330
RAILROAD BRAKE SHOES
Richard H. Gilbert, Bergen, N.J., assignor to Abex Corporation, New York, N.Y.
Filed Mar. 15, 1971, Ser. No. 123,994
Int. Cl. F16d 69/02
U.S. Cl. 161—165
1 Claim

ABSTRACT OF THE DISCLOSURE

The tendency of a railroad brake shoe of the composition shoe type, as distinguished from the cast metal type, to fracture and separate from its backing is diminished by interposing between the shoe and the back an intermediate support layer characterized by a strip of rubber containing reinforcing cords.

---

This invention relates to brake shoes of the composition type, characterized by a body of friction material presenting a binder matrix at least in part of thermosetting resin or rubber containing dispersed particles contributing to wear resistance and affording the desired friction coefficient.

Composition railroad brake shoes in field use are subjected to severe abuse from the standpoint of mechanical loading when the shoe is brought into engagement with the wheel of the railroad car. It is a frequent occurrence for the shoe to fracture, resulting in large chunks separating from the conventional steel back. Such separation or socalled "fall out" is most prevalent at the ends or toes of the shoe, and a second prominent occurrence is for the shoe to split in the middle. The hazard to freight or passenger traffic is obvious. The primary object of the present invention is to diminish this hazard, and specifically by interposing between the steel back and the friction body a resilient, supporting layer of rubber in strip form containing reinforcing cords, especially of the kind used in the manufacture of automobile tires.

These objectives are attained in actual practice by selecting a body of raw or unvulcanized diene rubber, natural or synthetic, containing reinforcing cords. I can resort to any commercial tire rubber, whether it be natural rubber or a synthetic rubber such as SBR rubber or polybutadiene synthetic (Buna S or Buna N) rubber. The cords may be constructed from glass fibers, natural fibers such as cotton or synthetic fibers such as rayon, nylon or polyester.

Other and further objects of the present invention will be apparent from the following description and claims and are illustrated in the accompanying drawing which, by way of illustration, show preferred embodiments of the present invention and the principle thereof and what is now considered to be the best mode contemplated for applying that principle. Other embodiments of the invention embodying the same or equivalent principles may be used and structural changes may be made as desired by those skilled in the art without departing from the present invention.

In the drawing:

FIG. 1 is an elevation, party in section, of a typical railroad brake shoe in which the present invention may be incorporated; and FIG. 2 is a schematic sectional view showing the manner in which the shoe of the present invention may be molded.

The precise composition of the friction body of the present railroad brake shoe may be widely varied in both a physical and composition sense, but in all instances the friction body will be composed of a binder represented at least in part by a thermosetting resin or vulcanizable diene rubber containing dispersed particles which contribute to wear resistance, which afford the desired level of friction coefficient and which themselves reinforce or strengthen the body as a whole. The binder may also be a mixture of rubber and the resin. The wear resistant particles in most instances will be a mixture of cast iron particles and a mineral of the sillimanite type, while the reinforcing material will include asbestos. The desired friction coefficient is attained by selecting a balance between particles such as the long wear particles already mentioned, lead sulphide, petroleum coke, cashew nutshell polymer granules with or without a thermosetting resin, and so on.

Thus the composition may vary widely inasmuch as the present contribution to the art resides in physically interposing a resilient, reinforced layer between the friction body and the steel back, which experience reveals will greatly diminish the tendency for the friction body to catastrophically fracture in field use.

Nonetheless, the practice of the present invention does comprehend a binder matrix for the friction body in the form of a thermosetting resin or an elastomer, or mixture thereof.

EXAMPLE 1

|  | Parts by weight | |
|---|---|---|
| Example | 1 | 2 |
| Material: | | |
| Binder (A) | 15 | 12.2 |
| White cast iron particles | 10.0 | |
| Calcined kyanite | 10.0 | 13.0 |
| Lead sulphide | 19.5 | 22.5 |
| Lead | 4.6 | 5.6 |
| Calcined petroleum coke | 21.6 | 39.3 |
| Asbestos (Grade 4K) | 10.8 | |
| Aloxite | | 0.8 |
| Accelerator activator: | | |
| Litharge | 3.4 | 2.7 |
| Zinc oxide | 5.1 | 4.2 |
| Naptha (solvent) | 4.0 | 4.0 |

(BINDER A)

| Ingredient: | Parts by weight |
|---|---|
| Buna-S (23½% styrene) | 44.0 |
| Cashew nutshell liquid polymer (intermediate stage of heat growth) | 44.0 |
| Rubber cure: | |
| Sulphur | 8.8 |
| Benzothiazole disulphide | 0.91 |
| Copper dimethyl dithiocarbamate | 0.46 |
| Hexamethylenetetramine | 1.83 |

The above example serves to demonstrate the latitude possible under the essentially physical operating conditions of the present invention. The cast iron particles and calcined kyanite are long wearing filler particles having a synergistic action explained in U.S. Pat. No. 2,901,456; and hence, variations and substitutions are possible if this action is not necessary in the end use. The asbestos is a filler and also a strengthener. Lead, lead sulphide, graphite and coke are fillers present to display advantageous friction modifying and surface effects in the finished article when used in the intended manner in a brake installation, but again omissions and substitutions can be made dependent upon the degree of friction and modification thereof that may be deemed important.

In producing friction elements in accordance with Example 1, the rubber and cashew nut shell liquid polymer in a preliminary or uncured state are first worked together intimately in a mill after which the ingredients used to vulcanize, cure and set the binder and advance the liquid polymer are added thereto and the mixture transferred to a blade mixer. The naphtha solvent is then added to the ingredients affording the bond, the mixture agitated until a paste condition is obtained and then are added the fillers including the cast iron particles, calcined kyanite, the friction modifier and enhancer and the asbestos where such is to be used for enhancing body strength. Mixing is continued until a uniform composition is attained.

The binder matrix may be entirely rubber rather than a mixture therewith of the thermosetting, phenolic resin represented by the cashew polymer. Butadiene-styrene rubber is preferred because of superior performance encountered in field use, but other vulcanizable diene rubbers may be used as well such as butadiene acrylonitrile rubber. Likewise, the binder matrix may be entirely of thermosetting resin which itself may be a Novolac as already mentioned, or other suitable phenolic reactive with hexamethylene tetramine.

It is appropriate at this stage of the disclosure to refer to the drawing, FIG. 1, where the shoe as a whole is identified by reference character 12, comprising a friction and wear body 10, a steel back 14 and an intermediate layer 15 interposed between the back and the composition body. The shoe 12, FIG. 1, is shown in its manufactured form.

The intermediate layer 15 may be from one-sixth to one-half inch thick. It consists essentially of rubber containing reinforcing cords, about 80% by weight rubber and remainder cords. The rubber may be any rubber used for automotive tires, natural or synthetic, and this is equally true of the cords. In fact, the preferred form is to resort to scrap material produced as waste during the preparation of tire side-wall casings; rubber belting scrap may be used as well.

In any event, the intermediate layer 15 is vulcanized to the friction body 10 and is bonded to the steel back as well. The reinforcing cords apparently constitute numerous bridges or ties to the friction body, preventing catastrophic fracture of the body 10 under severe vibration as shown by data hereinafter.

In manufacturing the shoe, FIG. 2, the steel back 14 is positioned at the bottom of a mold 24. An unvulcanized strip of cord-reinforced rubber 15A is juxtaposed on the steel back and becomes the intermediate layer 15 of the shoe when the composition is cured. Next, a selected amount 10A of the composition prepared in accordance with Example 1 is placed atop the strip 15A, and then the ram or punch 26 applies enough pressure to compact the whole mass under a compression ratio of 4:1 to 5:1.

The dense shape thus formed in the mold or press is removed therefrom and vulcanized or cured under time-temperature parameters sufficient to harden the binder to its final stage of heat cure, which also vulcanizes the cord-reinforced rubber layer 15A and bonds it as the intermediate support layer 15, FIG. 1, to both the friction body 10 and the back 14. Preferably, to promote a superior bond between the layer 15 and the back 14, the free face of the latter in the mold, FIG. 1, is itself coated wtih a vulcanizable rubber-thermosetting resin cement such as Plastilok cement.

The problem of the shoe fracture has been prevalent for several years, but no answer was readily apparent, especially an answer which could be evaluated. A test for evaluation was ultimately perfected after several trials, which was to subject the shoe (including the steel back of course) to steady, violent vibration determined as subjecting the shoe, over a 10–30 minute period, to the dynamics the shoe would encounter over a period of several weeks to several months in actual field service. Early failure, to accelerate the test, was induced by transversely notching the friction face of the shoe about 2½ inches inward from each end.

By such a test, it was found that on average the shoe of the present invention (Example 1), did not fracture and separate until after 9.8 minutes of vibration compared to only 4.1 minutes for a comparison shoe of the same geometry and friction composition. The comparison shoe differed only in one significant respect, namely, it had a layer between the steel back and the friction composition composed of a mixture of bonding rubber and resin, curing agents for promoting cure, fillers and asbestos, a mixture determined by actual practice, prior to the present invention, as a perfectly acceptable bond between the steel back and the body of friction material. Thus the distinction between the best prior practice known to me, compared to the present invention, is the presence of the reinforcing cords accounting for more than 100% increase in the "time to failure" established by the test referred to above. This test, incidentally, is deemed sufficiently valid to justify commercial production of composition railroad brake shoes incorporating the present invention.

Any tire reinforcing cord will serve the purpose of this development. Twenty-five years again, or so, tire cords were predominently cotton; and successively, rayon, nylon and polyester filaments were and are now used to construct the cords. Glass fibers and others can be expected to be used in the future. The point is that any rubber used for tire casings is cord-reinforced; this unvulcanized material will bond both to the steel back and to the friction body a brake shoe having a matrix composed of rubber or thermosetting resin.

The cords vary from 15 to 25% by weight of the rubber layer as 15A. Their length, on average, is about 1½". This denier size of the cords may vary: for rayon, 1100 to 2200 denier presented by 720 to 1440 filaments per cord diameter; for polyester, 1000 to 1300 denier, 250 filaments per cord diameter; and so on. Whatever is acceptable for a tire casing is acceptable in the present instance.

As noted above, the matrix for the shoe may vary as to composition. The following are additional examples, preferably processed in the presence of a solvent as in Example 1:

FILLERS

| Example | Parts by weight | | |
|---|---|---|---|
| | 2 | 3 | 4 |
| Ingredient: | | | |
| Barytes | | | 10 |
| Lead sulphide | 18 | | |
| Alumina | | 2 | 2 |
| Graphite | 7 | 41.5 | 15 |
| Asbestos | 5 | 16.5 | 42 |
| Calcined kyanite | 13 | | |
| Cast iron | 20 | 25 | |
| Lead | 5 | | |
| Brass chips | | | 8 |
| Cured cashew resin friction particles | 5 | | 5 |

BONDS

| Example | Parts by weight | | |
|---|---|---|---|
| | 2 | 3 | 4 |
| Ingredient: | | | |
| Unvulcanized butadiene-sytrene rubber | 3 | | |
| Liquid cashew resin (uncured) | 17 | | |
| Powdered phenol-formaldehyde resin (incompletely cured) | | 15 | |
| Tung oil modified liquid phenolformaldehyde resin | | | 18 |

It will be appreciated that the examples set forth above are representative of many examples of production compositions in which proportions may be widely varied and substitutions made depending upon the level of friction desired, the nature of the brake rigging used on the car and tolerances permitted for railroad service. Hence, while I have set forth preferred compositions for the friction body, and the intermediate support layer characterizing the present invention, it will be appreciated that these are capable of variation and modification by those skilled in the art.

I claim:

1. A composition railroad brake shoe characterized by a body of friction material having a matrix composed at least in part of a binder selected from the group consisting of diene rubber and thermosetting phenolic resin containing dispersed particles which contribute wear resistance and the required level of friction coefficient, an intermediate support layer molded and vulcanized to the back of the friction body, and a metal backing united to the back of the support layer, said support layer consisting of a body of rubber containing reinforcing cords, said reinforcing cords being fibers selected from the group consisting of natural fibers, synthetic fibers and glass fibers, and being about one-sixth to one-half inch thick.

References Cited

UNITED STATES PATENTS

| | | | |
|---|---|---|---|
| 2,272,532 | 2/1942 | Shriver | 161—406 |
| 2,686,140 | 8/1954 | De Gaugne | 161—162 |
| 3,608,606 | 9/1971 | Marzocchi | 161—144 |
| 2,406,653 | 8/1946 | Batchelor | 181—251 R |
| 2,911,074 | 11/1959 | Fraula et al. | 188—251 A |
| 3,585,102 | 6/1971 | Burgess | 161—162 |
| 2,781,107 | 2/1957 | Smith et al. | 188—251 A |
| 2,901,456 | 8/1959 | Spokes et al. | 161—162 |
| 2,333,453 | 11/1943 | Tilden | 188—251 A |
| 1,890,425 | 12/1932 | Whitworth | 188—251 A |

CHARLES E. VAN HORN, Primary Examiner

U.S. Cl. X. R.

161—170, 164, 202, 203, 217, 221; 188—251 A, 251 R, 259